(12) United States Patent
Lee

(10) Patent No.: US 8,670,003 B2
(45) Date of Patent: Mar. 11, 2014

(54) METHOD AND APPARATUS FOR DISPLAYING SCREEN OF MOBILE TERMINAL WITH TOUCH SCREEN

(75) Inventor: Seung Myung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 58 days.

(21) Appl. No.: 13/312,239

(22) Filed: Dec. 6, 2011

(65) Prior Publication Data

US 2012/0147049 A1 Jun. 14, 2012

(30) Foreign Application Priority Data

Dec. 10, 2010 (KR) .......................... 10-2010-0125925

(51) Int. Cl.
*G09G 5/00* (2006.01)
*G06F 3/048* (2013.01)

(52) U.S. Cl.
USPC ............................ 345/660; 715/810; 715/815

(58) Field of Classification Search
None
See application file for complete search history.

(56) References Cited

U.S. PATENT DOCUMENTS

| 5,615,384 | A  | * | 3/1997  | Allard et al. ................... 715/800 |
| 7,383,503 | B2 | * | 6/2008  | Banks ........................... 715/273 |
| 8,416,205 | B2 | * | 4/2013  | Rapp et al. ..................... 345/173 |
| 2006/0112354 | A1 | | 5/2006 | Park et al. |
| 2006/0119619 | A1 | * | 6/2006 | Fagans et al. ................. 345/619 |
| 2009/0058821 | A1 | * | 3/2009 | Chaudhri et al. ............. 345/173 |
| 2009/0303231 | A1 | | 12/2009 | Robinet et al. |
| 2010/0095206 | A1 | | 4/2010 | Kim |
| 2010/0156816 | A1 | | 6/2010 | Relyea, Jr. et al. |

FOREIGN PATENT DOCUMENTS

KR   10-0984817 B1   10/2010

* cited by examiner

*Primary Examiner* — Joni Richer
*Assistant Examiner* — Yi Wang
(74) *Attorney, Agent, or Firm* — Cha & Reiter, LLC

(57) ABSTRACT

A method and apparatus for displaying a screen of a mobile terminal with a touch screen are provided. The method for displaying an edit screen of a mobile terminal with a touch screen, includes: displaying at least one item having the same size on an idle screen in an idle mode; receiving edit mode entry input for editing the at least one item; and setting sizes of respective items to different ones according to location of the items within the touch screen during an edit mode for display.

20 Claims, 9 Drawing Sheets

FIG. 6B
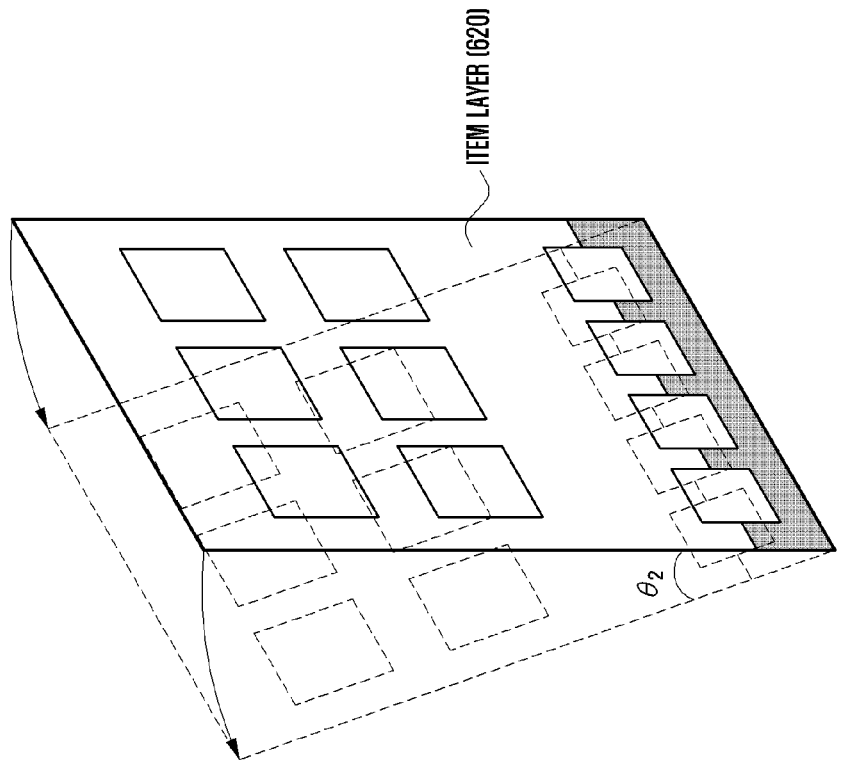
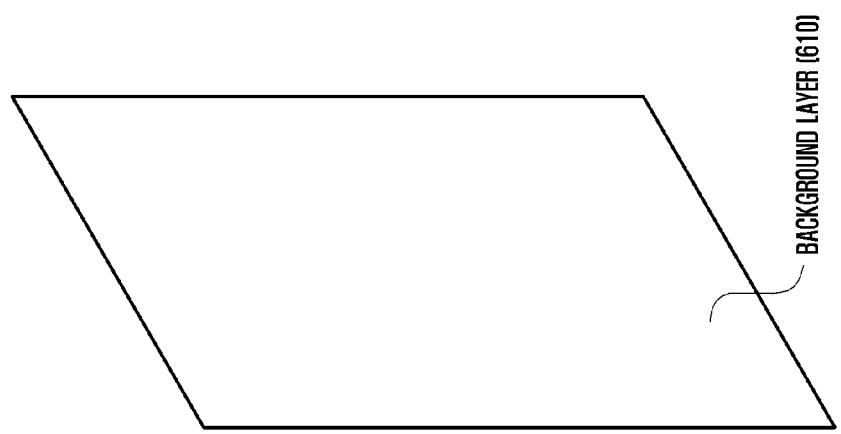

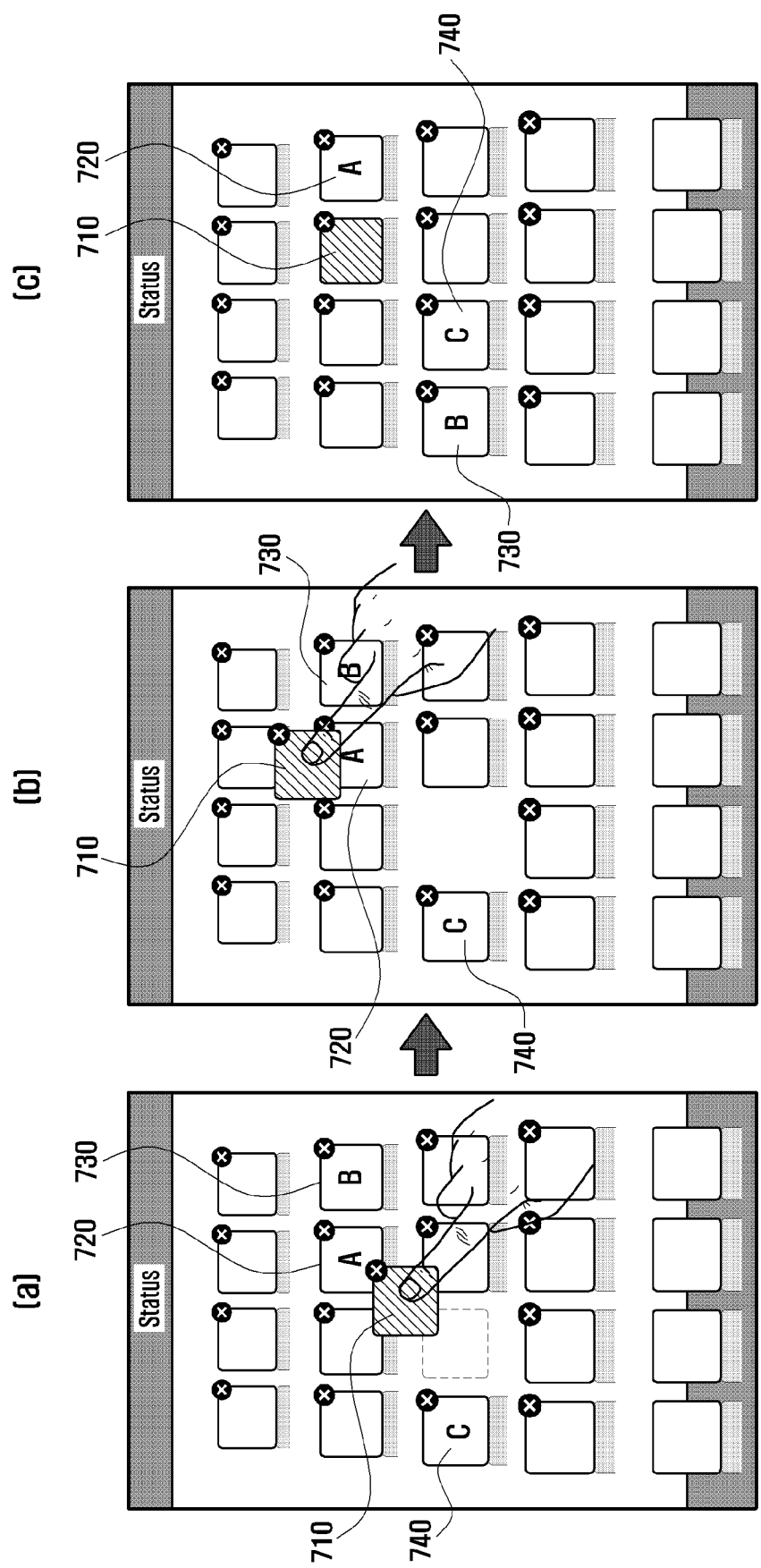

METHOD AND APPARATUS FOR DISPLAYING SCREEN OF MOBILE TERMINAL WITH TOUCH SCREEN

CLAIM OF PRIORITY

This application claims the benefit of priority under 35 U.S.C. §119 of an application filed in the Korean Intellectual Property Office on Dec. 10, 2010 and assigned Ser. No. 10-2010-0125925, the contents of which are hereby incorporated by reference in its entirety.

BACKGROUND OF THE INVENTION

1. Field of the Invention

The present invention relates to a method and apparatus for displaying a screen of a mobile terminal having a touch screen, and more particularly, to an apparatus and method for displaying items according to predetermined criteria so that user knows the phone is an edit mode.

2. Description of the Related Art

In recent years, a mobile terminal has become a multimedia device capable of providing various additional services such as an electronic dictionary function, a game function, and a schedule management function, etc. As such, there is a need for a user interface that allows a user to conveniently manage and use various types of applications.

The foregoing mobile terminal typically displays an installed application, an application installed by a user, various types of a widget, and folders (referred to as 'item' hereinafter) on an idle screen. Here, the idle screen may include a main screen or a home screen. The main screen is a screen provided with a number of application items corresponding to different applications in the mobile terminal, and the home screen is a screen that a user edits items in the main screen according to the user's preferences.

Meanwhile, the user may enter an edit mode for edition such as location change, deletion, and addition of various types of items displayed on an idle screen of the mobile terminal. However, a conventional edit mode does not provide an awareness that the user is in the edit mode.

SUMMARY OF THE INVENTION

The present invention has been made in view of the above problems, and provides a method for displaying an edit screen with respective items have different sizes according to positions of the items when the mobile terminal enters an edit mode for customization, and an apparatus thereof.

In accordance with an aspect of the present invention, a method for displaying an edit screen of a mobile terminal with a touch screen, includes: displaying a plurality of items in same size on the touch screen during an idle mode; receiving a request for an edit mode; and adjusting the size of respective items differently according to location of the items during the edit mode for display.

In accordance with another aspect of the present invention, for a terminal for displaying a plurality of items includes: a touch screen unit displaying the items during an idle mode or an edit mode; and a controller displaying the items in same size during the idle mode and adjusting the size of the items differently according to location of the items during the edit mode for display.

The present invention configures an edit screen such that respective items have different sizes for display when a mobile terminal enters an edit mode. Accordingly, a user may intuitively recognize the state that the mobile terminal enters an edit mode. Further, when an item is moved, the size of the item changes according to a moved position. As a result, the present invention further provides an esthetical user interface to a user.

BRIEF DESCRIPTION OF THE DRAWINGS

The above features and advantages of the present invention will be more apparent from the following detailed description in conjunction with the accompanying drawings, in which:

FIG. 6a to FIG. 6c are views illustrating implemented examples of a concrete graphical interface set such that respective items have different sizes according to arranged positions of the items; and FIG. 7 is a view illustrating an example of a procedure setting the sizes of items upon movement of the items.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

As used herein, the term "item" means a unit for recognizing or executing an application, a folder, and a widget. In this case, an object item may be displayed by an optional shape, color, or a combination thereof.

Figure 1:
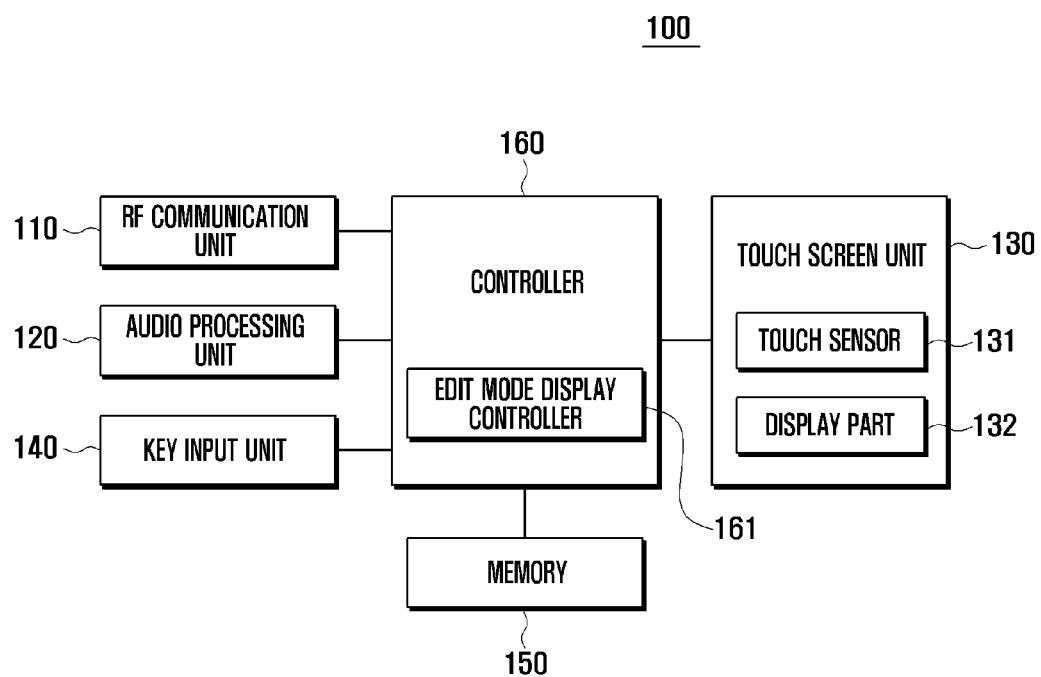
FIG. 1 is a block diagram illustrating a configuration of a mobile terminal according to an exemplary embodiment of the present invention.

FIG. 1 is a block diagram illustrating a configuration of a mobile terminal 100 according to an exemplary embodiment of the present invention.

As shown, a mobile terminal 100 of the present invention may include a radio frequency (RF) communication unit 110, an audio processing unit 120, a touch screen unit 130, a key input unit 140, a memory 150, and a controller 160.

The RF communication unit 110 executes transmitting/receiving functions of corresponding data for RF communication of the mobile terminal 100. The RF communication unit 110 may include an RF transmitter for up-converting a frequency of a signal for transmission and amplifying the signal, and an RF receiver for low-noise-amplifying a received signal and down-converting a frequency of the signal. Further, the RF communication unit 110 may receive data through an RF channel and output the received data to the controller 160. The RF communication unit 110 may transmit the data received from the controller 160 through the RF channel.

The audio processing unit 120 may be configured by a CODEC. The CODEC may be configured by a data CODEC processing packet data and an audio CODEC processing an audio signal. The audio processing unit 120 converts a digital audio signal into an analog audio signal through an audio CODEC and plays the analog audio signal through a speaker SPK. The audio processing unit converts an analog audio signal input from a microphone MIC into a digital audio signal.

The touch screen unit 130 includes a touch sensor 131 and a display part 132. The touch sensor 131 senses the touch input of a user and generates and transmits a sensing signal to the controller 160. The touch sensor 131 may be configured by a touch sensor such as a capacitive overlay type, a resistive overlay type, or an infrared beam type or a pressure sensor. Besides the foregoing sensors, various types of a sensor device capable of sensing a contact or pressure of an object may be used as the touch sensor 131. The sensing signal contains coordinate data corresponding to the touch input of a user. When a user inputs a touch operation, the touch sensor 131 generates and transmits a sensing signal with coordinate data of a touch position movement path to the controller 160.

In particular, the touch sensor 131 may sense the user input for switching the mobile terminal from an idle mode to an edit mode according to an embodiment of the present invention.

The display part 132 may be configured by a Liquid Crystal Display (LCD), Organic Light Emitting Diodes (OLED), or Active Matrix Organic Light Emitting Diodes (AMOLED). The display part 132 visibly provides a menu of the mobile terminal 100, input data, function setting information, and various information to a user. The display unit 132 executes a function outputting a booting screen, an idle screen, a menu screen, a call screen, and other application screens of the mobile terminal 100.

The mobile terminal 100 of the present invention may be configured to include the foregoing touch screen. However, is should be noticed that the foregoing embodiment of the present invention may be applied to other terminals with or without the touch screen.

The key input unit 140 receives a key operation of a user for controlling the mobile terminal 100, and generates and transfers an input signal to the controller 160. The key input unit 140 may be configured by a key pad with numeral keys or arrow keys. Predetermined number of function keys may be provided at one surface of the mobile terminal 100 as the key input unit 140.

The memory 150 stored programs and data necessary for an operation of the mobile terminal 100. The memory 150 may be divided into a program area and a data area. The program area may store a program controlling an overall operation of the mobile terminal 100, an operating system (OS) booting the mobile terminal 100, an application program necessary for playing multimedia contents, and application programs necessary for other option functions such as a camera function, a sound playing function, image or moving image playing function. Data created according to use of the mobile terminal 100 are stored in the data area. Images, moving images, phone-books, and audio data may be stored in the data area.

The controller 160 controls an overall operation for respective structural elements of the mobile terminal 100. In particular, the controller 160 may control a series of procedures constructed such that respective items have different sizes according to positions/location and changes in the item positions during an edit mode. To do this, the controller 160 according to an embodiment of the present invention may further include an edit mode display controller 161.

When the mobile terminal 100 enters an edit mode, the edit mode display controller 161 sets the sizes of respective items displayed differently on an idle screen according to arranged positions thereof and displays the set items on an edit screen. For examples, when the mobile terminal 100 enters an edit mode, the edit mode display controller 161 may set the sizes of items arranged on the same row to be same. Also, if there are a plurality of rows including at least one item, the edit mode display controller 161 may control the sizes of items included in an upper row to be smaller than those included in a lower row. Moreover, upon receiving a movement command input for a particular item, the edit mode display controller 161 sets the size of a moved item to be identical with items in the newly moved row and displays the item in new size on the edit screen.

The foregoing embodiment has illustrated that the controller 160 and the edit mode display controller 161 are configured separately, and respective blocks execute different functions for illustrative purpose. However, it should be noticed that the controller 160 may execute certain functions executed by the edit mode display controller 161.

Figure 2:
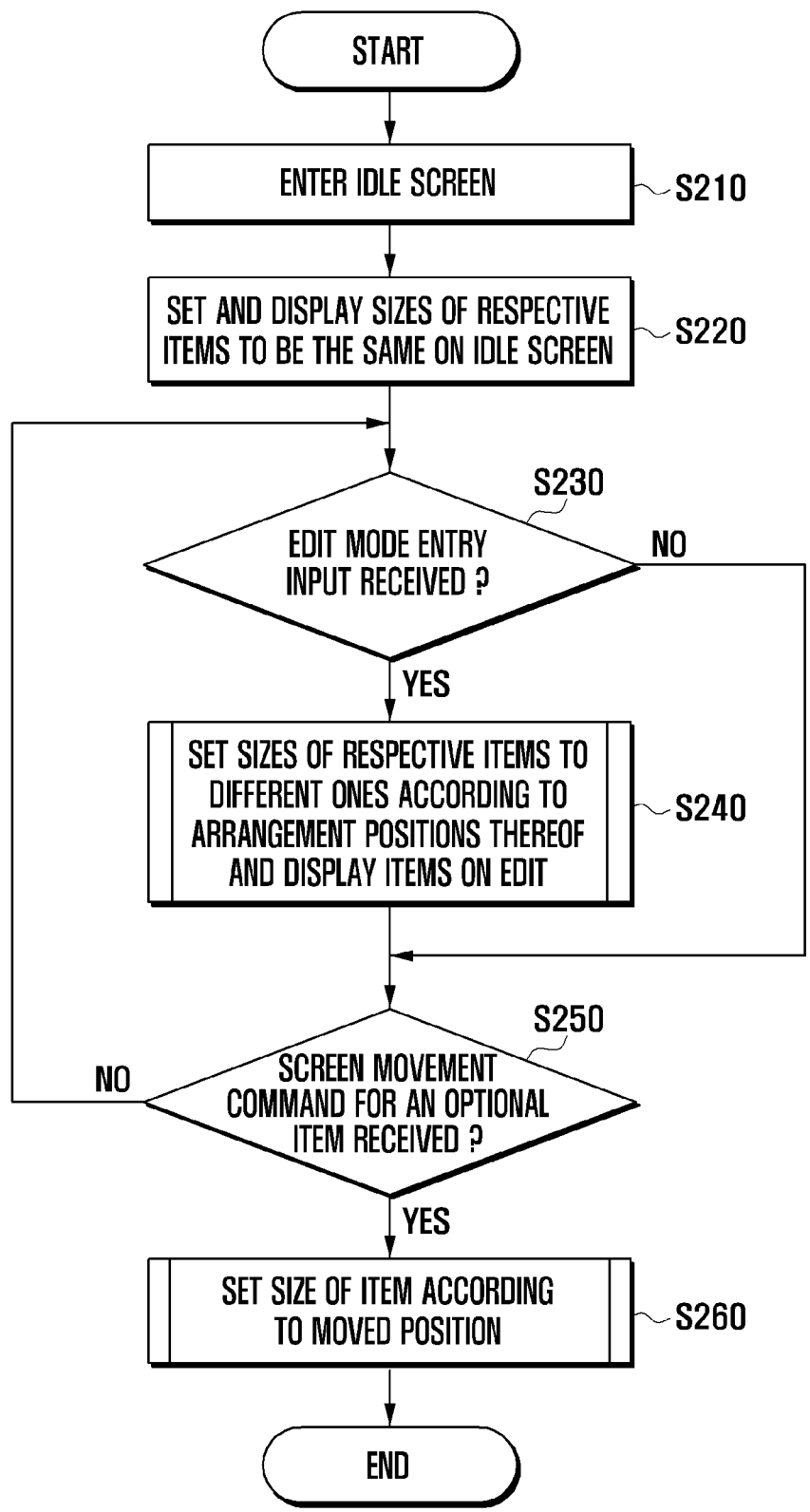
FIG. 2 is a flowchart illustrating a method for displaying an edit screen according to an exemplary embodiment of the present invention.

FIG. 2 is a flowchart illustrating a method for displaying an edit mode according to an exemplary embodiment of the present invention.

First, a controller 160 senses that a mobile terminal enters an idle screen (S210). The idle screen may include a main screen or a home screen. Here, the main screen is a screen providing a number of items (icons) representing different applications of the mobile terminal. The home screen is a screen that represents the main screen during an edit mode so that a user can customize the arrangement order of the items according to the user's preferences. For example, most frequently used applications can be moved in the first row for faster retrieval. Note that the home screen refers to a mode when a user wants to organize the icons corresponding to different application according to his or her preference, and the main screen shows a number of icons representing different application that was set by the manufacturer. That is, the home screen refers to changing or customizing the main screen according to a user's preference. A number of pre-installed application, an application installed by a user, various types of a widget, and folders (referred to as 'item' hereinafter) may be displayed on an idle screen. After entering the idle screen, the controller 160 at first sets the sizes of respective items to be identical with each other and displays the set items on the idle screen (S220).

Figure 5:
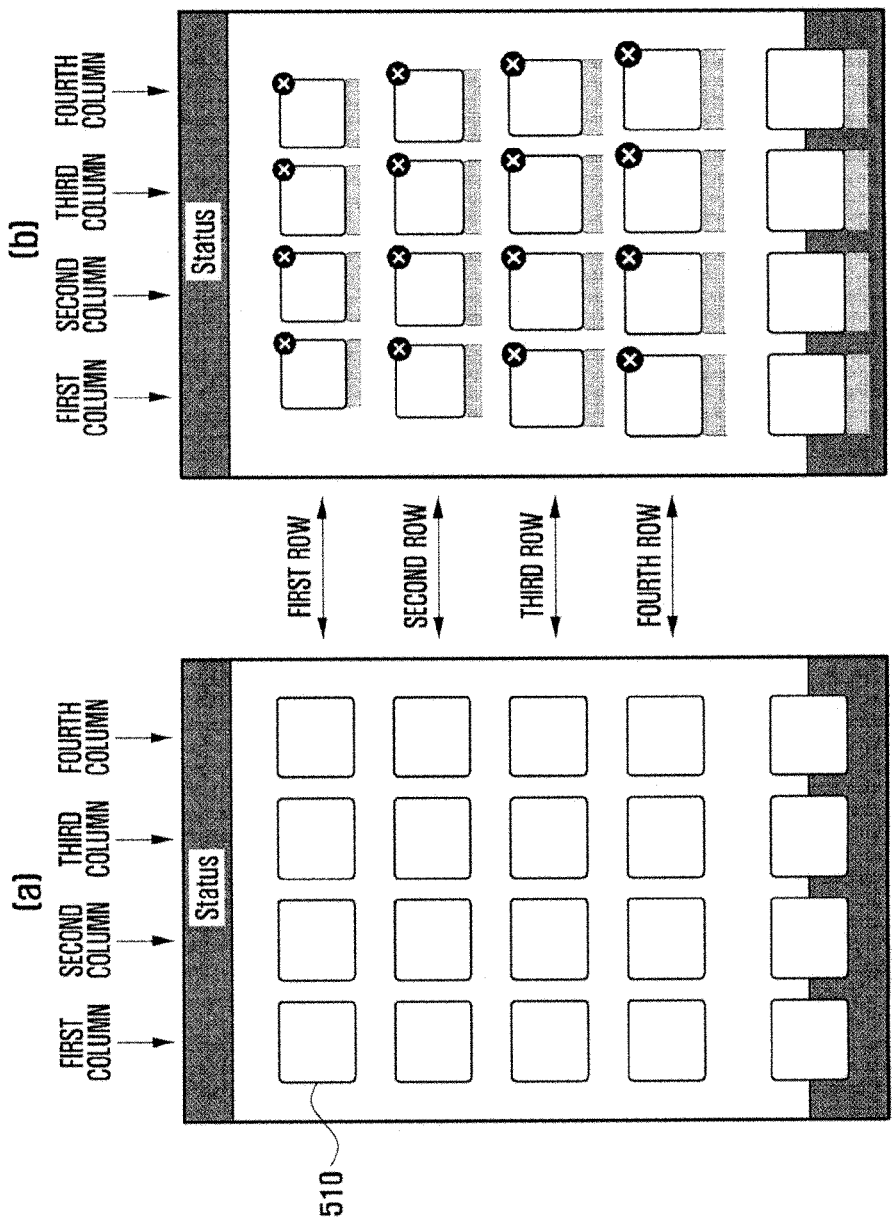
FIG. 5a is a view illustrating an example of items displayed on an idle screen.
FIG. 5b is a view illustrating an example of setting the sizes of the items to different ones and displaying the items on an edit screen.

FIG. 5(*a*) shows an example of items displayed on the idle screen. As shown, the idle screen may be divided into at least one row and at least one column. For example, it may be expressed that an item 510 is located at a first row and a first column. Here, at least one item is set and displayed to have the same size regardless of a row or a column on the idle screen.

Referring back to FIG. 2, the controller 160 determines whether edit mode entry input is received (S230). The edit mode entry input may include soft key input for entering the edit mode or touch input touching an optional item or an optional area for more than a predetermined time. If the edit mode entry input is not received, the process proceeds to S250 and a description thereof will be described below.

If the edit mode entry input is received, the controller 160 sets the sizes of respective items to different ones according to arranged positions/location thereof and displays the set items on an edit screen (S240). To this end, as shown in FIG. 5(*b*), the controller 160 may display both the item and reflected light corresponding to the item. Or, the controller 160 may display a shade at lower ends of the respective items.

Figure 3:
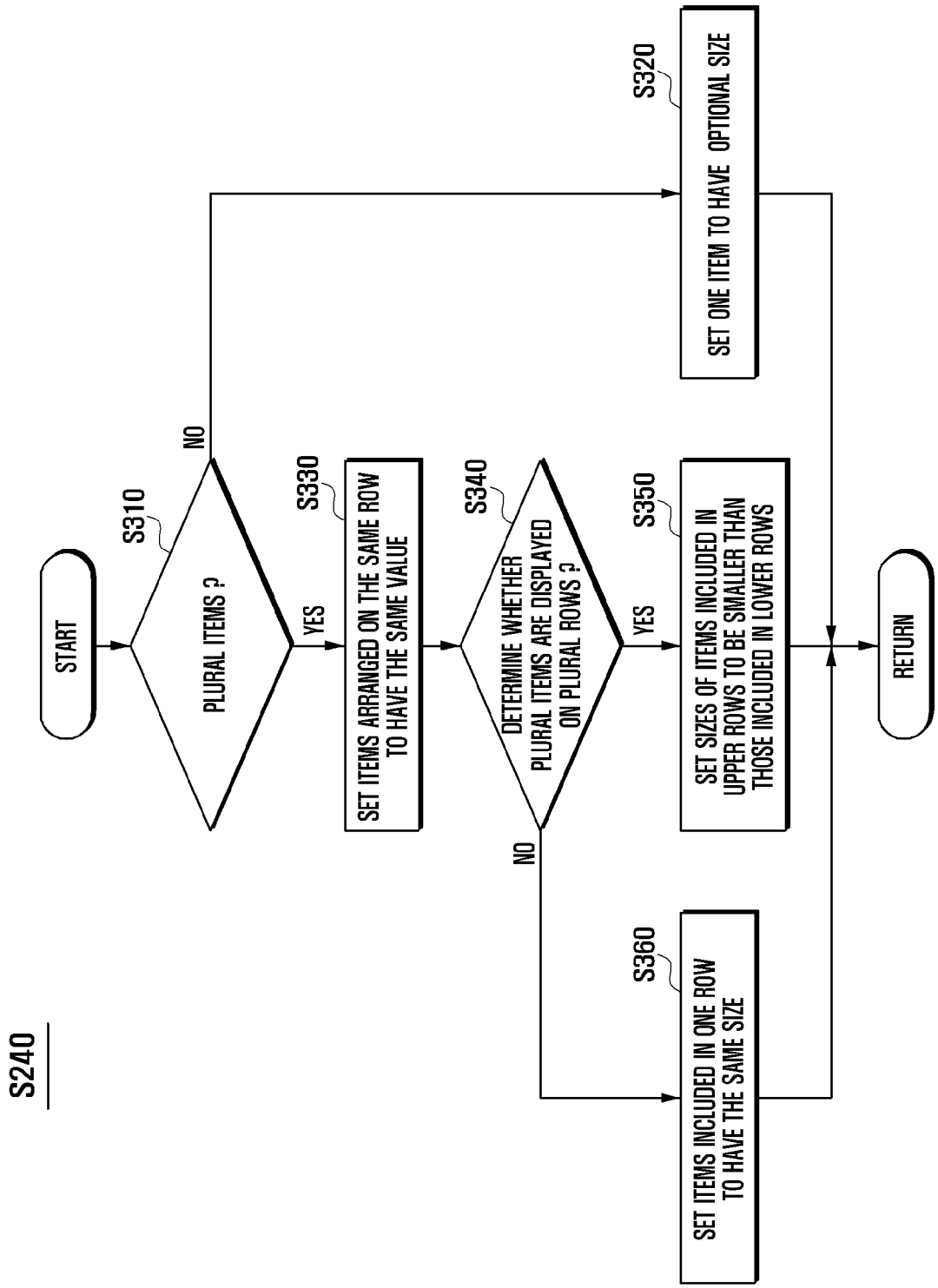
FIG. 3 is a flowchart illustrating a concrete execution procedure of S240 shown in FIG. 2.

FIG. 3 is a flowchart illustrating a concrete execution procedure of S240 shown in FIG. 2.

The controller 160 determines whether plural items are displayed on the edit screen (S310). When plural items are not displayed on the edit screen, that is, when one item is displayed thereon, the controller 160 sets one item to a specific size and displays the one item on the edit screen (S320).

On the other hand, when the plural items are displayed on the edit screen, the controller 160 sets the sizes of items arranged on the same row on the edit screen to be same (S330). The controller 160 determines whether the plural items are displayed on plural rows (S340). That is, the controller 160 determines whether there are a number of items on more than one row. If so, the controller 160 sets the sizes of items included in upper rows (first row) to be smaller than those included in lower or next rows in sequence (S350). FIG. 5*b* is a view illustrating a concrete example of S240 and FIG. 3 setting the sizes of the items to different ones and displaying the items on an edit screen. When the number of rows on which an item is displayed is one, the controller 160 sets items included in the one row to have the same size (S360).

In an alternate embodiment, the sizes of the items may be set to become smaller sequentially as it goes from the upper row to the lower row. For example, the sizes of items arranged in a first row are set to be smaller than those of items arranged in a second row. Then, the sizes of items arranged in the second row are set to be smaller than those of items arranged in a third row.

In FIG. 5(*b*), an 'x' arranged at an upper right end of each item is an icon for removing a corresponding item. If the corresponding item is an item that a user may not optionally remove, such as an embedded application, the 'x' may not be displayed on the corresponding item.

Figure 6A:
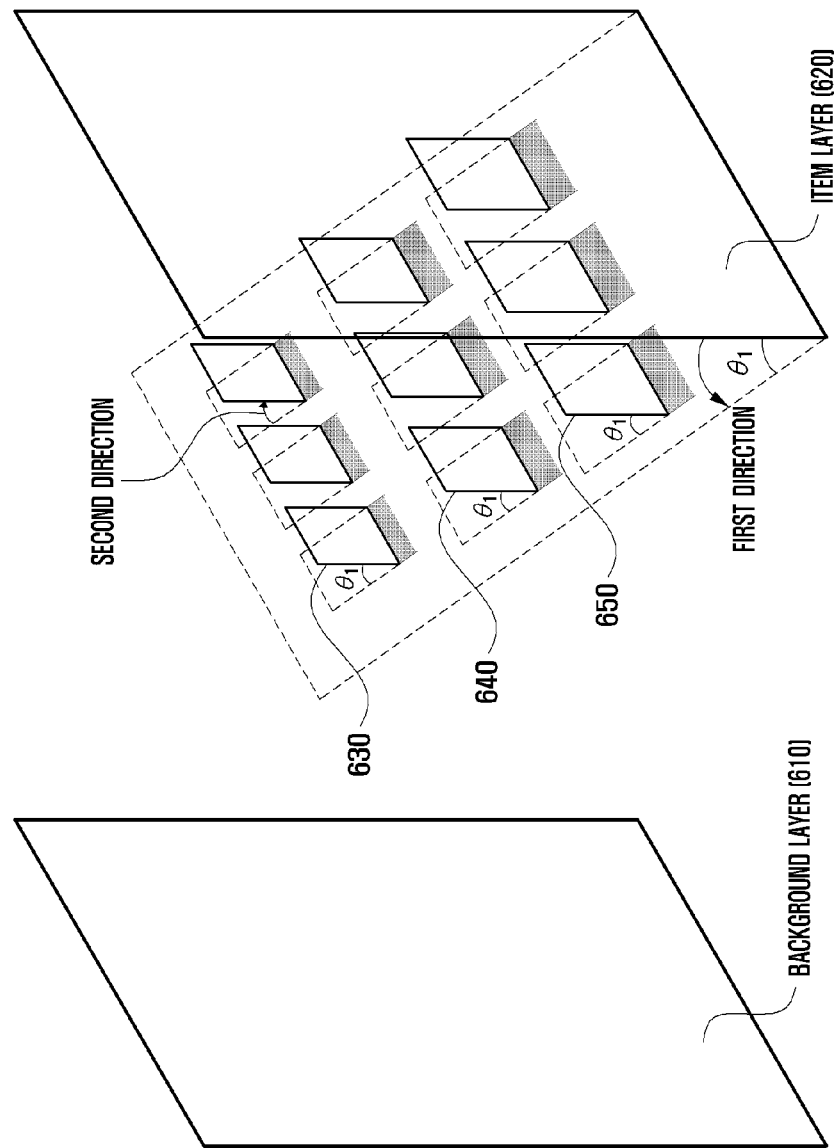
Figure 6C:
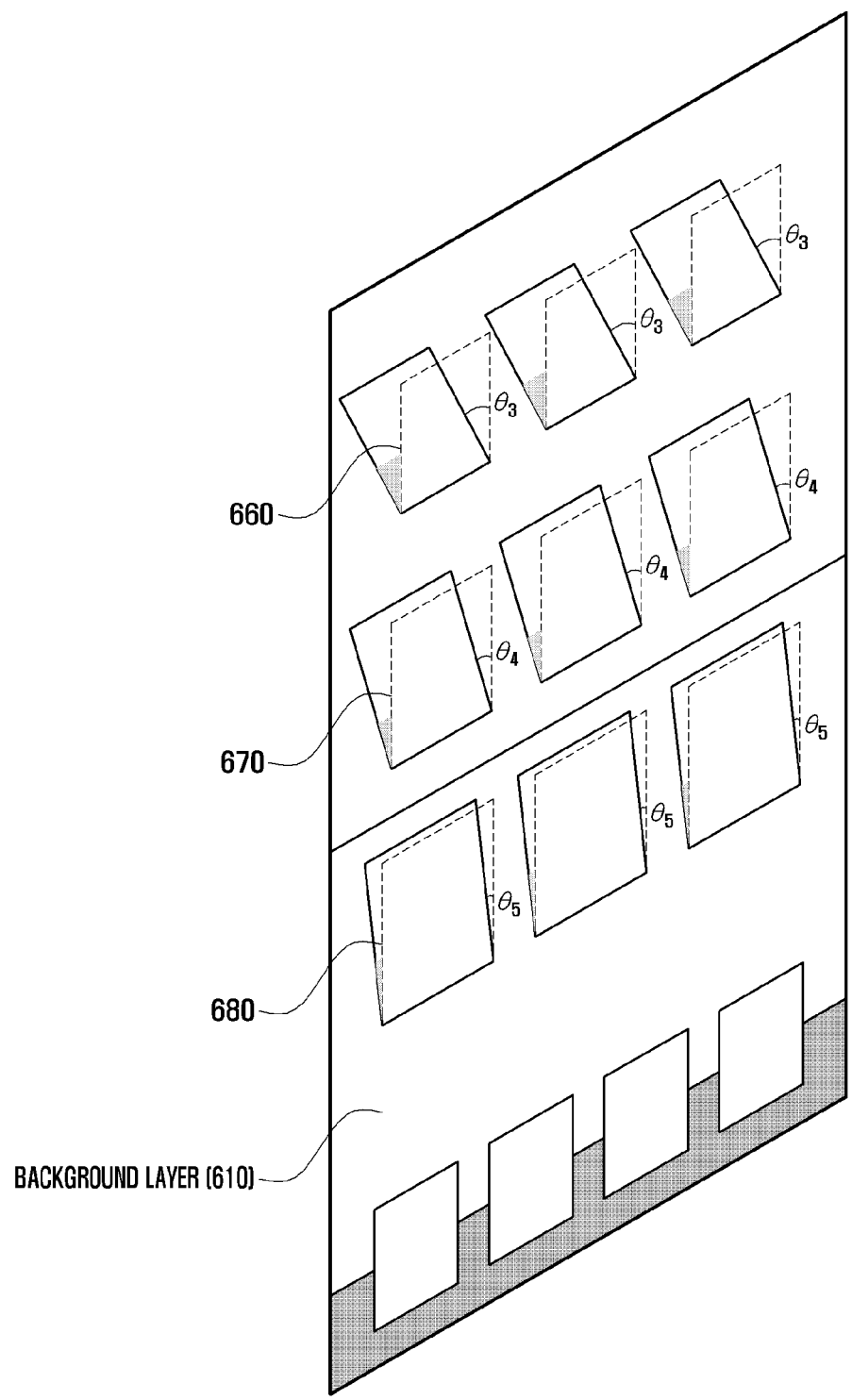

FIG. 6*a* to FIG. 6*c* are views illustrating implemented examples of a graphical interface set such that respective items have different sizes according to arranged positions of the items.

FIG. 6*a* is a view illustrating an implemented example of a graphical interface according to the first embodiment of the present invention.

Referring to FIG. 6*a*, the display part 132 of the mobile terminal 100 may include at least one layer. It is assumed that at least one layer includes a background layer 610 and an item layer 620. Here, a background screen is displayed on the background layer 610 and items are display on the item layer 620.

When the mobile terminal 100 displays an idle screen in an idle mode, the background layer 610 and the item layer 620 run parallel with each other. That is, the background layer 610 and the item layer 620 forms an angle of 0°. However, when the mobile terminal 100 enters an edit mode, the item layer 620 can be configured to display an incline angle of a first angle $\theta_1$ in a first direction from the background layer 610.

As a result, the sizes of items arranged in upper rows may be set to be smaller for display than those of items arranged in lower rows.

Moreover, the respective items may be displayed to have an inclined angle in a second direction by a first inclined angle of the item layer 620.

FIG. 6*b* is a view illustrating an implemented example of a graphical interface according to the second embodiment of the present invention.

When the mobile terminal 100 displays an idle screen in an idle mode, the background layer 610 and the item layer 620 run parallel with each other. That is, the background layer 610 and the item layer 620 forms an angle of 0°. However, when the mobile terminal 100 enters the edit mode to display the edit screen, the item layer 620 can be configured to display the items to have an inclined angle by a second angle $\theta_2$ in a first direction from the background layer 610.

Accordingly, items arranged in upper rows may be located farther than those in lower rows from a sight sense of a user. As a result, the user recognizes that the items arranged in the upper rows have a smaller size than those arranged in the lower rows.

FIG. 6*c* is a view illustrating an implemented example of a graphical interface according to the third embodiment of the present invention.

Referring to FIG. 6*c*, it is assumed that the display part 132 includes only the background layer 610 in the third embodiment. When the mobile terminal 100 displays the idle screen in the idle mode, at least one item 660, 670, and 680 are set and displayed in the background layer 610 to have the same size.

Thereafter, when the mobile terminal 100 enters the edit mode to display the edit screen, the at least one items 660, 670, and 680 can be displayed to have an inclined angle by a predetermined angle from the background layer 610. In this case, items included in the same row incline at the same angle. For example, items arranged in a first row incline by a third angle $\theta_3$, and items arranged in a second row incline by a fourth angle $\theta_4$.

In the third embodiment, inclined angles of items arranged in the upper rows may be set larger than those of items arranged in the lower rows. For example, the third angle may be larger than the fourth angle. As the inclined angle of the items become larger as it goes toward the upper row, the items arranged on the upper row are located further than the items arranged on the lower row from the view of the user. Accordingly, the user recognizes that the sizes of items arranged in upper rows are smaller than those of items arranged in low rows. It should be noted that different combination of sizes can be applied to a particular row or columns according to the teachings of the present invention so that the user can view the items different from the idle mode as it is switched to an edit mode.

Referring back to FIG. 2, the controller 160 determines whether a movement command for an optional item is received (S250). If the movement command for a particular item is received, the controller 160 sets the size of the item according to a newly moved position of the item and displays the item accordingly (S260).

Figure 4:
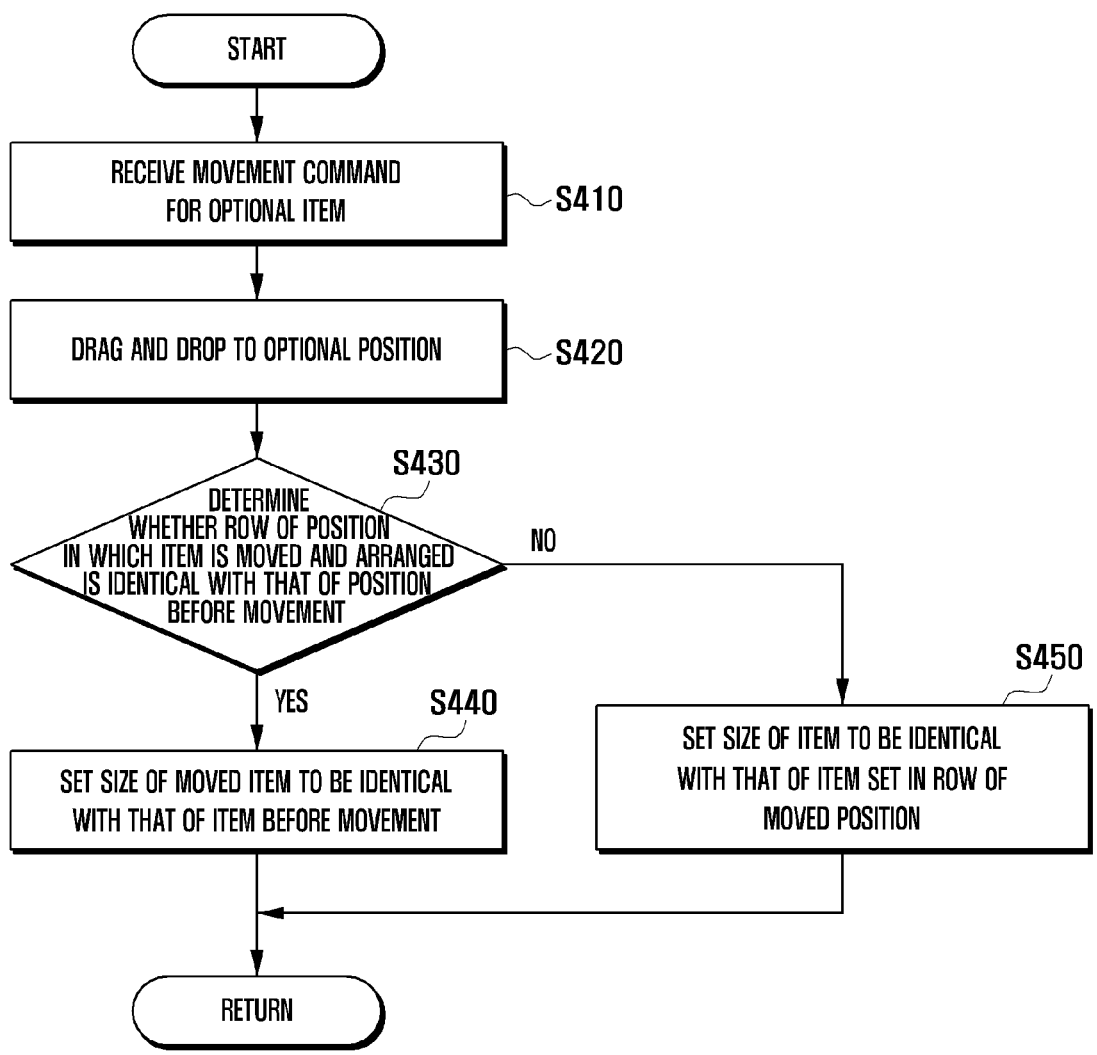
FIG. 4 is a flowchart illustrating a concrete execution procedure of S260 shown in FIG. 2.

FIG. 4 illustrates an execution procedure of S260 shown in FIG. 2.

First, the controller 160 receives a movement command for a particular item (S410). The movement command may include Drag and Drop input after touching the item. Accordingly, the controller 160 sense Drag and Drop to an optional position after touching the optional item (S420).

Next, the controller 160 determines whether a row of a position in which the item is moved is identical with that of a position before movement (S430). If the row of a position in which the item is moved to is identical with that at a position before movement, the controller 160 sets the size of the moved item to be identical with that of the item before the movement and displays the set item on the edit screen (S440).

If the row of a position in which the item is newly moved to differs from that of a position before movement, the controller 160 sets the size of the item to be identical with that of an item set in a row of a moved position (S450).

FIG. 7 is a view illustrating an example of a procedure setting the sizes of items upon movement of the items.

Referring to FIG. 7(*a*), an item movement command is received from a user in an edit mode. The item movement command may be touch input for an item 710 to be moved. When the item movement command is received, the item 710 may be spaced apart from a touch point by a set distance based on an arrange position of an item.

FIG. 7(b) illustrates a procedure moving a touched item 710 in a dragged direction according to drag input. FIG. 7(c) illustrates a procedure dragging the touch item 710 to drop in an optional position. Upon the drop, the size of the item 710 is set to be identical with that of an item set for a row of a moved position. That is, the size of the item 710 is set to be identical with that of the item 720.

Meanwhile, if the item 720 is moved and arranged in displayed positions (second row, third column) of the item 720, the item 720 is moved and arranged in a second row and a fourth column of an optional direction (right direction in FIG. 7) by one column. Accordingly, since the item 720 is moved and arranged in an arranged position (second row, fourth column) of a conventional item 730, the item 730 is moved and arranged in an optional direction (right direction in FIG. 7) by one column. However, in this case, because a displayed position of the item 730 is a last column of the display part 132, the item 730 is moved and arranged in a next row and a first column (third row, first column). In this case, since a conventionally arranged row is the second row and a moved and arranged row is the third row, the size of the item 730 is set to be identical with that of an item set for the third row being an arranged row after movement.

It should be noted that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the present invention mentioned configures an edit screen such that respective items have different sizes according to arranged positions between the items when a mobile terminal enters an edit mode. Accordingly, a user may intuitively recognize the state that the mobile terminal enters an edit mode. Further, an item is moved, the size of the item changes according to a moved position. As a result, the present invention may provide an esthetical user interface to a user during the operation of an edit mode.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for displaying an edit screen of a mobile terminal having a touch screen, the method comprising:
   displaying a plurality of items in the same size on the touch screen at first respective positions during an idle mode;
   receiving a request for an edit mode; and
   during the edit mode, adjusting the size of respective items differently according to location of the items, and displaying the respective items with size adjusted in approximately the first positions thereof.

2. The method of claim 1, wherein the items are arranged into at least one row and at least one column.

3. The method of claim 2, wherein adjusting the respective item size comprises setting the size of the items arranged in the same row as same.

4. The method of claim 3, wherein adjusting the respective item size comprises setting the size of the items arranged in each row differently from each other.

5. The method of claim 4, wherein adjusting the respective item size comprises setting the size of items arranged in an upper row to be smaller than a lower row.

6. The method of claim 2, further comprising:
   receiving a movement input for a particular item;
   relocating the item according to the received movement input to a new location; and
   setting a size of the moved item to be identical with that of size preset at the new location.

7. The terminal of claim 6, wherein the controller simultaneously displays the items reflecting light corresponding to the items or providing a shade lower ends of respective items during the edit mode.

8. The method of claim 1, wherein adjusting the respective item size comprises simultaneously displaying the items on the edit screen and reflected light corresponding to the items or providing a shade at lower ends of respective items.

9. The method of claim 1, wherein the plurality of items are displayed arranged in at least first and second rows at the first respective positions; and
   further comprising displaying, in the edit mode, all the items in the first row tilted at the same angle with respect to all of the items in the second row.

10. A method for displaying an edit screen of a mobile terminal having a touch screen the method comprising:
    displaying a plurality of items in the same size on the touch screen during an idle mode:
    receiving a request for an edit mode; and
    adjusting the size of respective items differently according to location of the items during the edit mode for display;
    wherein the screen comprises a background layer and an item layer running parallel to each other, wherein adjusting the respective item size comprises inclining the item layer including the items at a first angle in a first direction from the background layer during the edit mode.

11. The method of claim 10, wherein inclining the item layer comprises inclining respective items included in the item layer in a second direction by the first angle, the second direction being opposite to the first direction.

12. A terminal for displaying a plurality of items, comprising:
    a touch screen unit displaying the items during an idle mode or an edit mode; and
    a controller displaying the items in the same size during the idle mode at respective first positions, and. during the edit mode, adjusting the size of respective items differently according to location of the items, and displaying the respective items with size adjusted in approximately the first positions thereof.

13. The terminal of claim 12, wherein the items are arranged into at least one row and at least one column.

14. The terminal of claim 13, wherein the controller sets the size of the items arranged in the same row as same for display during the edit mode.

15. The terminal of claim 14, wherein the controller sets the size of the items arranged in different rows differently for display during the edit mode.

16. The terminal of claim 15, wherein the controller sets the size of the items arranged in an upper row to be smaller than a lower row for display during the edit mode.

17. The terminal of claim 12, wherein the touch screen comprises a background layer and an item layer which are parallel to each other, wherein the controller inclines and displays the item layer including the items at a first angle in a first direction from on the background layer during the edit mode.

18. The terminal of claim 17, wherein the controller inclines and displays respective items included in the item layer in a second direction by the first angle, the second direction being opposite to the first direction.

19. The terminal of claim 12, wherein the controller relocates a particular item according a movement input to a new location, and sets a size of the moved item to be identical with that of size preset at the new location.

20. The terminal of claim 12, wherein the plurality of items are displayed arranged in at least first and second rows at the first respective positions; and in the edit mode, all the items in the first row are displayed tilted at the same angle with respect to all of the items in the second row.

* * * * *

UNITED STATES PATENT AND TRADEMARK OFFICE
CERTIFICATE OF CORRECTION

| | | |
|---|---|---|
| PATENT NO. | : 8,670,003 B2 | Page 1 of 1 |
| APPLICATION NO. | : 13/312239 | |
| DATED | : March 11, 2014 | |
| INVENTOR(S) | : Seung Myung Lee | |

It is certified that error appears in the above-identified patent and that said Letters Patent is hereby corrected as shown below:

In the Claims:

Column 8, Claim 10, Line 31 should read as follows:
--...a touch screen, the...--

Column 8, Claim 12, Line 51 should read as follows:
--...positions, and, during the...--

Signed and Sealed this
Sixth Day of May, 2014

Michelle K. Lee
*Deputy Director of the United States Patent and Trademark Office*